United States Patent
Megiddo et al.

(10) Patent No.: US 6,182,070 B1
(45) Date of Patent: Jan. 30, 2001

(54) SYSTEM AND METHOD FOR DISCOVERING PREDICTIVE ASSOCIATION RULES

(75) Inventors: Nimrod Megiddo, Palo Alto; Ramakrishnan Srikant, San Jose, both of CA (US)

(73) Assignee: International Business Machines Corporation, Armonk, NY (US)

(*) Notice: Under 35 U.S.C. 154(b), the term of this patent shall be extended for 0 days.

(21) Appl. No.: 09/137,621

(22) Filed: Aug. 21, 1998

(51) Int. Cl.$^7$ .................................................. G06F 17/30
(52) U.S. Cl. ...................... 707/6; 707/1; 707/2; 707/3; 707/7; 707/10
(58) Field of Search ................... 707/1, 2, 3, 6, 707/7, 10; 709/200; 395/11, 500.23

(56) References Cited

U.S. PATENT DOCUMENTS

| | | | |
|---|---|---|---|
| 5,724,573 | | 3/1998 | Agrawal et al. ................... 707/6 |
| 5,758,147 | * | 5/1998 | Chen et al. ........................ 707/6 |
| 5,765,028 | * | 6/1998 | Gladden .......................... 395/11 |
| 5,884,305 | * | 3/1999 | Kleinberg et al. ................ 707/6 |
| 5,899,992 | * | 5/1999 | Iyer et al. ........................ 707/7 |
| 5,943,667 | * | 8/1999 | Aggarwal et al. ................ 707/3 |
| 5,946,683 | * | 8/1999 | Rastogi et al. ................... 707/6 |
| 5,974,441 | * | 10/1999 | Rogers et al. .................. 709/200 |
| 5,978,788 | * | 11/1999 | Castelli et al. ................... 707/2 |
| 5,978,796 | * | 11/1999 | Malloy et al. .................... 707/3 |
| 5,983,222 | * | 11/1999 | Morimoto et al. ................ 707/6 |
| 5,991,752 | * | 11/1999 | Fukuda et al. ................... 707/1 |
| 6,006,216 | * | 12/1999 | Griffin et al. .................... 707/2 |
| 6,023,571 | * | 2/2000 | Matsumoto et al. ......... 395/500.23 |
| 6,032,146 | * | 2/2000 | Chadha et al. ................... 707/6 |
| 6,038,601 | * | 3/2000 | Lambert et al. ................ 709/226 |
| 6,049,797 | * | 4/2000 | Guha et al. ...................... 707/6 |
| 6,061,682 | * | 5/2000 | Agrawal et al. .................. 707/6 |
| 6,078,918 | * | 6/2000 | Allen et al. ...................... 707/6 |

OTHER PUBLICATIONS

Agrawal et al., "Database Mining: A Performance Perspective", IEEE, 1993, pp. 914–925.*
Cai et al., "Mining Association Rules with Weighted terms", IEEE, Feb. 1998, pp. 68–77.*
Aggarwal et al., "Online Generation of Association Rules", IEEE, Feb. 1998, pp. 402–411.*
Chen et al., "Using a Hash–Based Method with Transaction Trimming for Mining Association Rules", IEEE, 1997, pp. 813–825.*
Houtsma et al., "Set–Oriented Mining for Association Rules in Relational Databases", IEEE, 1995, pp. 25–33.*
Sung et al., "Data Mining in a Large Database Environment", IEEE, Jun. 1996, pp. 988–993.*
Lin et al., "Mining Association Rules: Anti–Skew Algorithms", IEEE, Feb. 1998, pp. 486–493.*
Savasere et al., "Mining for Strong Negative Associations in a Large Database of Customer Transactions", IEEE, Feb. 1998, pp. 494–502.*
Feng et al., "Binary Partition Based Algorithms for Mining Association Rules", IEEE, Feb. 1998, pp. 30–34.*
Zaki et al., "Evaluation of Sampling for Data Mining of Association Rules", IEEE, Jun. 1997, pp. 42–50.*

(List continued on next page.)

Primary Examiner—Wayne Amsbury
Assistant Examiner—Thuy Pardo
(74) Attorney, Agent, or Firm—Khanh Q. Tran, Esq.

(57) ABSTRACT

A system and method for determining the significance of association rules which are mined from a dataset is provided. Predictive association rules may also be generated based on the significance of an association rule. The statistical significance of an association rule may be used to estimate the number of false discoveries in a dataset or to rank discovered association rules by statistical significance to permit the user of the system to view the most statistically significant association rules first.

25 Claims, 3 Drawing Sheets

OTHER PUBLICATIONS

Yen et al., "An Efficient Data Mining Technique for Discovering Interesting Association Rules", IEEE, 1997, pp. 664–669.*

R. Agrawal et al, "Mining Association Rules Between Sets of Items In Large Databases", Proc 1993 ACM SIGMOD Conference, pp. 207–216, 1993.

* cited by examiner

SYSTEM AND METHOD FOR DISCOVERING PREDICTIVE ASSOCIATION RULES

BACKGROUND OF THE INVENTION

1. Field of the Invention

This invention relates generally to data processing, and more particularly to "computer database mining" in which generalized association rules between significant transactions that are recorded in a database are discovered. In particular, the invention concerns the identification (i.e., mining) and classifying of association rules from a large database.

2. Description of the Related Art

Customer purchasing habits can provide invaluable marketing information for a wide variety of applications. For example, retailers can create more effective store displays and more effectively control inventory that otherwise would be possible if they know that, given a consumer's purchase of a first set of items (a first itemset), the same consumer can be expected, with some degree of probability, to purchase a particular second set of items (a second itemset) along with the first set of items. In other words, it is helpful from a marketing standpoint to know that an association exists between the first itemset and the second itemset (the association rule) in a transaction. For example, it would be desirable for a retailer of automotive parts and supplies to be aware of an association rule expressing the fact that 90% of the consumers who purchase automobile batteries and battery cables (the first itemset) also purchase battery post brushes and battery post cleansers (referred to as the "consequent" in the terminology of the invention).

Advertisers too may benefit from a thorough knowledge of such consumer purchasing tendencies since they may change their advertising based upon the information mined from the database. In addition, catalog companies may be able to conduct more effective mass mailings if they know the tendencies of consumers to purchase particular sets of items with other set of items. It is understood, however, that although this discussion focuses on the marketing applications of the invention, database mining and, hence, the principles of the invention, are useful in many other areas such as business or science, for example.

Until recently, building large detailed databases that could chronicle thousands or even millions of transactions was impractical. In addition, the derivation of useful information from these large databases (i.e., mining the databases) was highly impractical due to the large amounts of data in the database which required enormous amount of computer processing time to analyze. Consequently, in the past, marketing and advertising strategies have been based upon anecdotal evidence of purchasing habits, if any at all, and thus have been susceptible to inefficiencies in consumer targeting that have been difficult if not impossible to overcome.

Modern technology, such as larger, faster storage systems and faster microprocessors, have permitted the building of large databases of consumer transactions. In addition, the bar-code reader may almost instantaneously read so called basket data (i.e., when a particular item from a particular lot was purchased by a consumer, how many items the consumer purchased, as so on) so that the basket data may be stored. In addition, when the purchase is made with, for example, a credit card, the identity of the purchaser is also known and may be recorded along with the basket data.

As described above, however, building a transactions database is only part of the marketing challenge. Another important part of the marketing challenge is mining the database for useful information, such as the association rules. The database mining, however, becomes problematic as the size of the database expands into the gigabyte or terabyte size.

Not surprisingly, many methods have been developed for mining these large databases. The problem of mining association rules from large databases was first introduced in 1993 at the ACM SIGMOD Conference of Management of Data in a paper entitled, "Mining Association Rules Between Sets of Items in a Large Database" by Rakesh Agrawal, Tomasz Imielinski and Arun Swami. In general, the input, from which association rules are mined, consists of a set of transactions where each transaction contains a set of literals (i.e., items). An example of an association rule is that 30% of the transactions is a particular database that contain beer and potato chips also contain diapers and that 2% of all transactions contains all of these items. In this example, 30% is the confidence of the association rule and 2% is the support of the rule. The problem is to find all of the association rules that satisfy user-specified minimum support and confidence constraints. As described above, this mining of association rules may be useful, for example, to such applications as market basket analysis, cross-marketing, catalog design, loss-leader analysis, fraud detection, health insurance, medical research and telecommunications diagnosis.

To better understand the context of the invention, a brief overview of typical association rules and their derivation is now provided. First let $I=\{1_1, 1_2, \ldots 1_m\}$ be a set of literals called items. Let D be a set of transactions, where each transaction, T, is a set of items such that $T \subseteq I$. Therefore, a transaction, T, contains a set A of some items in I if $A \subseteq T$. An association rule is an implication of the form $A \Rightarrow B$, where $A \subset I$, $B \subset I$, and $A \cap B = \emptyset$. The rule $A \Rightarrow B$ holds true in the transaction set D with a confidence, c, if c % of the transactions in D that contain A also contain B (i.e., the confidence in the conditional probability $p(B|A)$). The rule $A \Rightarrow B$ has support, s, in the transaction set D if s % of the transactions in D contain $A \cup B$ (i.e., the support is the probability of the intersection of the events). Given a set of transactions, D, the computational task of mining association rules is to generate all association rules that have a support value and a confidence value greater than a user-specified minimum support value and minimum confidence value.

The task of mining association rules may be decomposed into two steps. First, all of the combinations of items are found which have a transactions support above the minimum user-defined support and these combinations of items are called frequent itemsets. Next, the frequent itemsets are used to generate desired association rules. In particular, if ABCD and AB are frequent itemsets, then it is possible to determine if the association rule $AB \Rightarrow CD$ holds by computing the ratio, $r=\{support (ABCD)/support (AB)\}$. The association rule holds only if $r \geq$ the minimum confidence value. The first step of this association rule determination process requires the most computational time and therefore has been the focus of a great number of efforts to develop fast algorithms to discover frequent itemsets.

The second part of the association rule generation process has received much less attention. In particular, the process for analyzing the generating association rules for statistical significance has received the scant attention. Conventional association rule algorithms, as described above, may produce a very large number of output association rules. A large number of discovered association rules is, however, equally difficult to generate useful information from since these large number of discovered rules are no easier to review than the original data from which the association rules have been derived. The large number of discovered association rules has also raised the question of whether the set of discovered association rules "overfit" the data because all of the possible patterns that satisfy some constraints are generated which is known as the Bonferroni effect. In other words, the question is whether some of the discovered rules are "false discoveries" that are not statistically significant.

One conventional method for estimating significant association rules used a chi-squared test to look for correlated association rules, but did not take into account the number of hypotheses which were being tested. Another conventional method had a similar idea in arguing that a rule X⇒Y is not interesting if support (X⇒Y)≈support (X)×support (Y), but once again did not consider the number of hypotheses. It is desirable, however, to provide a system and method for discovering predictive association rules which takes into account the number of hypotheses and removes statistically insignificant association rules and it is to this end that the present invention is directed.

SUMMARY OF THE INVENTION

In accordance with the invention, a system and method are provided for estimating the number of "false discoveries" in order to generate association rules which have a high statistical significance. The estimation of the number of false discoveries may also indicate the overall efficiency of an association rule generation algorithm. The system in accordance with the invention may be used in connection with a conventional association rules discovery system to permit association rules discovered by the association rule discovery system to be ranked based on statistical significance so that the rules may be presented to a user in a ranked order. In another aspect of the invention, a confidence interval for the support and confidence of an association rule may be computed so that the variance in the confidence and support of the association rule may be used predictively on future data.

Thus, in accordance with an aspect of the invention, a computer implemented process for determining the statistical significance of one or more association rules mined from a dataset is provided. The method generates one or more synthetic databases front the dataset, each synthetic database containing a plurality of transactions and each transaction containing one or more items wherein the occurrences of all items in each synthetic database are independent and discovers a plurality of association rules having a similar probability threshold value for each synthetic database. The method also determines a probability of an unexpected result for each discovered association rule in each synthetic database to determine the statistical significance of each discovered association rule, and ranks the discovered association rules based on the determined probability in order to identify association rules which are statistically significant.

In accordance with another aspect of the invention, a computer program device is provided, comprising a computer program storage device readable by a digital processing apparatus, and a program means on the program storage device and including instructions executable by the digital processing apparatus for performing method steps for determining the statistical significance of one or more association rules mined from a dataset. The dataset comprises one or more transactions, wherein each transaction contains one or more items. The method generates one or more synthetic databases from the dataset based on random seeds, each synthetic database containing a plurality of transactions wherein the occurrences of all items are independent and discovers a plurality of association rules having a similar probability threshold value for each synthetic database. The method further determines a probability of an unexpected result for each discovered association rule in each synthetic database to determine the statistical significance of each discovered association rule, and ranks the discovered association rules based on the determined probability in order to identify association rules which are statistically significant.

In accordance with another aspect of the invention, a computer program product is provided for use with a computer system which includes a central processing unit and means coupled to the central processing unit for storing a database to determine the statistical significance of one or more association rules mined from a database. The computer program product comprises a data storage device including a computer usable medium having computer readable program means for determining the statistical significance of previously discovered association rules. The computer usable code means generates one or more synthetic databases from the dataset. Each synthetic database contains a plurality of transactions wherein the occurrences of all items in the databases are independent. The computer usable code means also discovers a plurality of association rules by analyzing the transactions having a similar probability threshold value for each synthetic database, determines a probability of an unexpected result for each discovered association rule in each synthetic database to determine the statistical significance of each discovered association rule, and ranks the discovered association rules based on the determined probability in order to identify association rules which are statistically significant.

In accordance with another aspect, the invention provides a program storage device readable by a digital processing apparatus and tangibly embodying program instructions executable by the digital processing apparatus to perform method steps for determining the statistical significance of one or more association rules mined from a database. The method generates one or more synthetic databases from the dataset, each synthetic database containing a plurality of transactions and each transaction containing one or more items, wherein the occurrences of all items in the synthetic databases are independent. The method also discovers a plurality of association rules having a similar probability threshold value for each synthetic database, determines a probability of an unexpected result for each discovered association rule in each synthetic database to determine the statistical significance of each discovered association rule, and ranks the discovered association rules based on the determined probability in order to identify association rules which are statistically significant.

In accordance with another aspect of the invention, a database mining system for determining the statistical significance of one or more association rules mined from a database is provided which generates one or more synthetic databases from the dataset, each synthetic database containing a plurality of transactions, each transaction including one or more items, wherein the occurrences of all items in each synthetic database are independent. The database mining system also discovers a plurality of association rules which have a similar probability threshold value for each synthetic database, determines a probability of an unexpected result for each discovered association rule in each synthetic database to determine the statistical significance of each discovered association rule, and ranks the discovered association rules based on the determined probability in order to identify association rules which are statistically significant.

In accordance with a still further aspect of the invention, a computer-based system for discovering purchasing tendencies of consumers by identifying association rules between itemsets of transactions is provided in which the computer-based system discovers association rules in a dataset and generates one or more synthetic databases from the dataset, each synthetic database containing a plurality of transactions wherein the occurrences of all items are independent. The computer-based system also discovers a plurality of association rules having a similar probability threshold value for each synthetic database, determines a probability of an unexpected result for each discovered association rule in each synthetic database to determine the statistical significance of each discovered association rule, and ranks the discovered association rules based on the determined probability in order to identify association rules which are statistically significant.

DETAILED DESCRIPTION OF A PREFERRED EMBODIMENT

Figure 1:
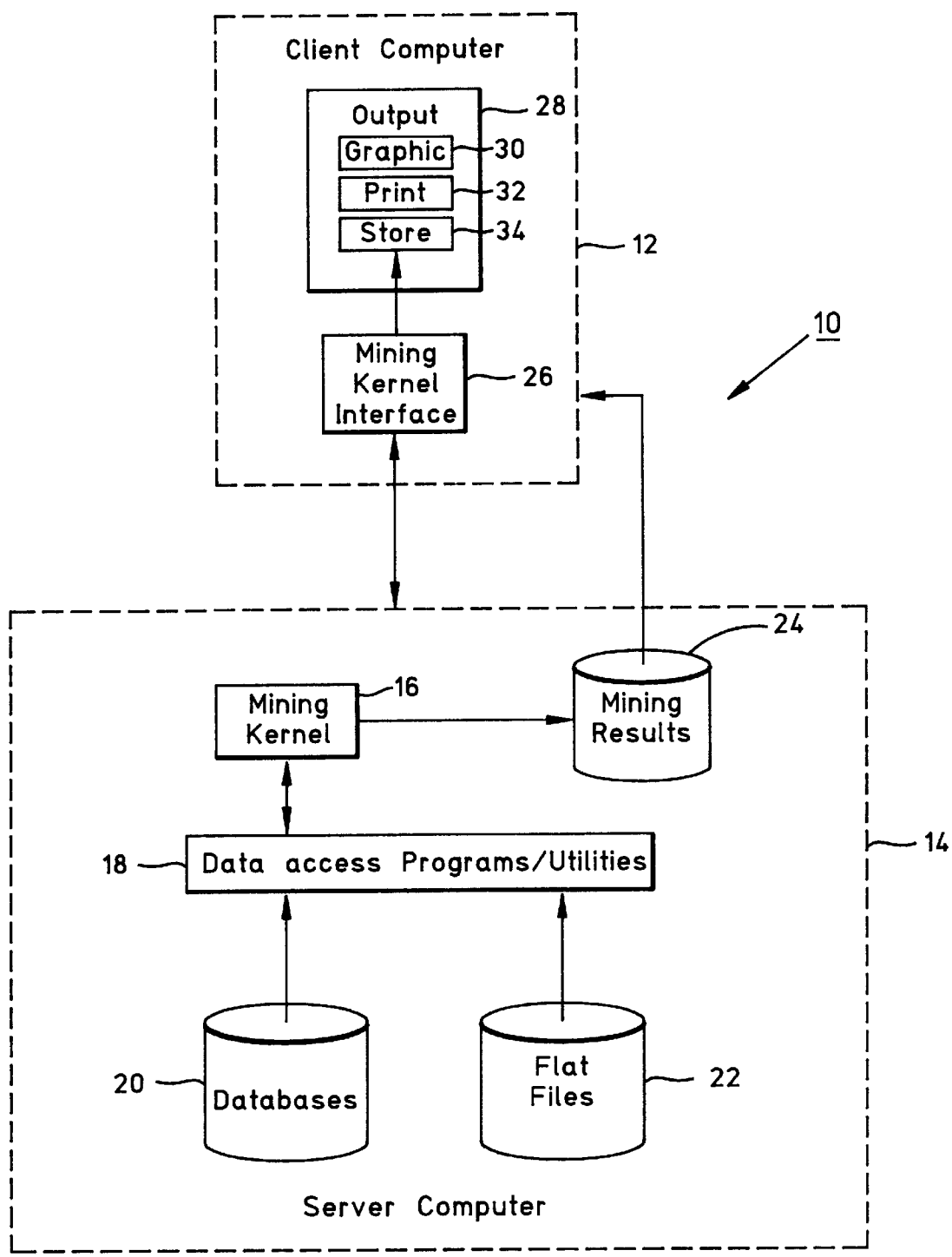
FIG. 1 is a functional block diagram illustrating a system that may be used for discovering predictive association rules in accordance with the invention.

FIG. 1 illustrates a computer system 10 which may be used for mining databases and in particular may be used for discovering predictive association rules in accordance with the invention. In the particular computer architecture shown, the system 10 may include one or more digital processing apparatus, such as a client computer 12 and a server computer 14. In a preferred embodiment, the server computer 14 may be a mainframe computer made by IBM Corp. of Armonk, N.Y. which uses a multitasking operating system such as that sold under the trademark MVS. The server computer 14 may also be a Unix computer, an OS/2 server, a Windows NT server or an IBM RS/6000 250 workstation with 128 Mb of main memory using the IBM AIX 3.2.5 operating system. The server computer 14 may include a database system, such as DB2 or ORACLE or it may have data on files on some other data storage medium, such as a disk (e.g., a 2 GB SCSI 3.5" drive) or a tape. As will be apparent, other computer architectures may also be used. For example, the functions of the client computer 12 may be incorporated into the server computer 14, and vice versa. The CPUs 12, 14 may also include computer operating systems and application programs for controlling their operation.

As shown, the operating system of the server computer 14 may include a predictive association rule identifier mining kernel 16 comprising a series of computer-executable instructions which may be executed by a processor (not shown) within the server computer 14. These computer-executable instructions may reside, for example, in a RAM (not shown) of the server computer 14. Alternatively, the instructions may be contained on a data storage device with a computer readable medium, such as a computer diskette 15 shown in FIG. 2. The instructions may also be stored on a direct access storage device (DASD) array, a magnetic tape, a conventional hard disk drive, electronic read-only memory, an optical storage device, or any other appropriate data storage device. In an illustrative embodiment of the invention, the computer-executable instructions may be compiled C++ language code.

Figure 2:
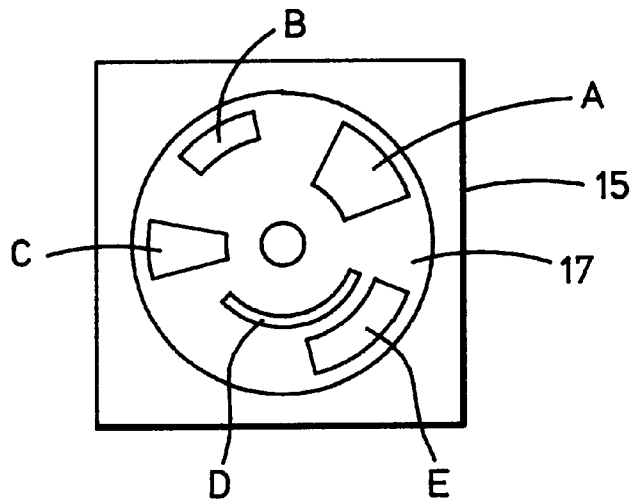
FIG. 2 illustrates a machine component embodying the invention, with portions cut away for illustration.
Figure 3:
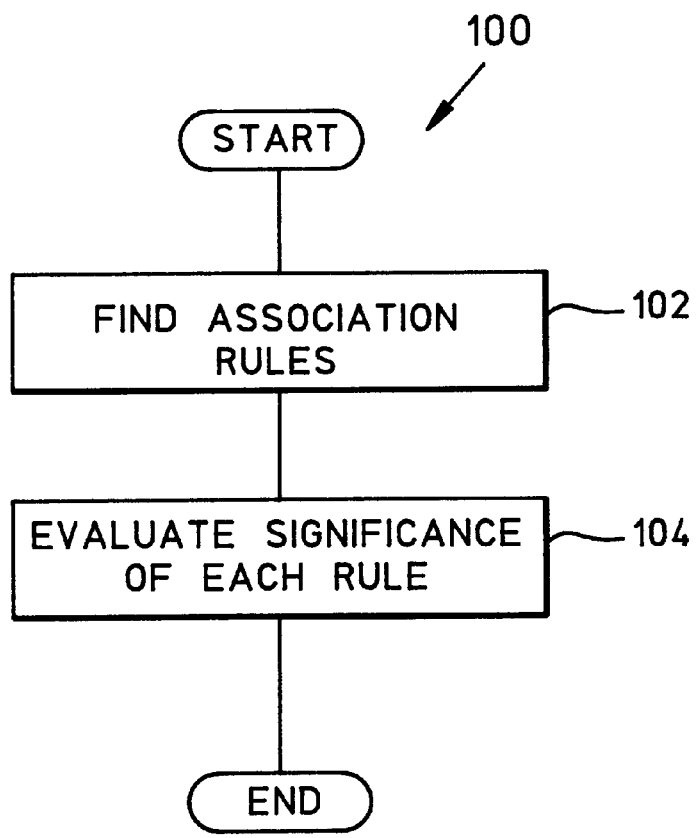
FIG. 3 is a flowchart illustrating the overall operation of the invention.
Figure 4:
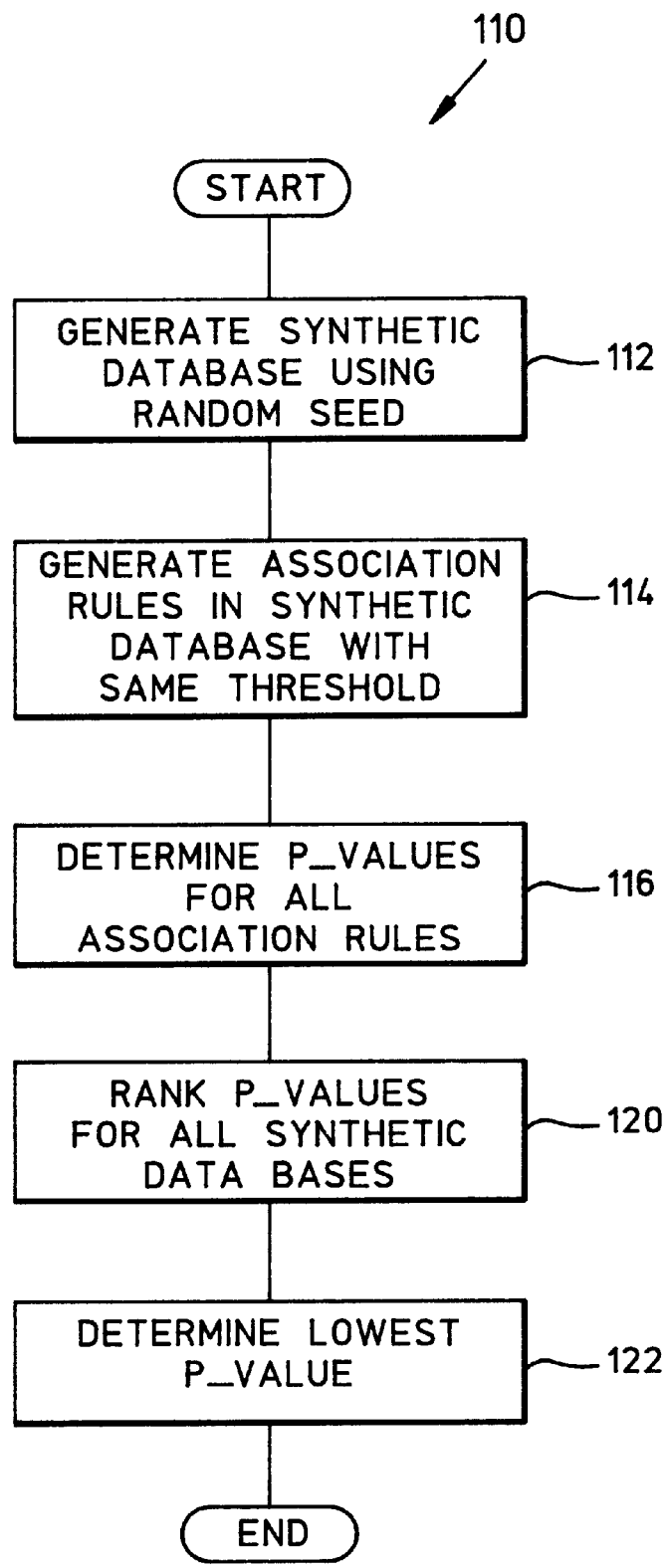
FIG. 4 is a flowchart illustrating a method for determining the statistical significance of an association rule in accordance with the invention.

The code may have a structure or sequence of instructions which controls the central processing unit of the server 14 to perform the processes shown in the flowcharts of FIGS. 3 and 4. FIGS. 3–4 illustrate the process performed by such instructions as embodied in a computer program. Preferable, the invention is practiced in its essential embodiment by a machine component that renders the computer program code elements in a form that instructs a digital processing apparatus (i.e., a computer) to perform a sequence of functional steps corresponding to those shown in the Figures. The machine component is shown in FIG. 2 as a combination of program code elements A–E in computer readable form that are embodied in a computer-usable data medium 17, on the computer diskette 15. As mentioned above, however, such media may also be found in semiconductor devices, on magnetic tape or on optical disks.

Each of the code elements A–E is for directing a digital processing apparatus to facilitate some portion of the method by which this invention is practiced. Even when no single code element A–E includes the complete method, two or more of the code elements together may comprise all of the program means necessary to facilitate the practice of the invention.

Returning to FIG. 1, the FIG. 1 shows that, through appropriate data access programs and utilities 18, the identifier kernel 16 accesses one or more databases 20 and/or flat files (i.e., text files) 22 which contain data about one or more consumer transactions. After executing the steps described below, the identifier kernel 16 outputs predictive association rules, falsely discovered association rules and statistically significant association rules which may be ranked based on their statistical significance. These outputs may be stored in a results repository 24, which may be accessed by the client computer 12.

FIG. 1 also illustrates that the client computer 12 may include an identifier kernel interface 26 which, like the identifier kernel 16, may be implemented as suitable computer code. Among other things, the interface functions as an input mechanism for establishing certain variables, including a minimum confidence and support value and the other predetermined/user-defined input parameters disclosed below. Further, the client computer 12 preferably includes an output module 28 for outputting/displaying the results stored in the results repository 24 on a graphical display 30, to a printing mechanism 32 or to a data storage medium 34. Now, the method for discovering association rules in accordance with the invention will be briefly described.

FIGS. 3 and 4 are flowcharts illustrating the process for discovering association rules in accordance with the invention. As shown in FIG. 3, a process 100 begins at step 102 in which association rules are mined from a database in a conventional manner as described in more detail below. Once the association rules have been mined, it is desirable to reduce the total number of association rules which the user the system must review. In step 104, the method in accordance with the invention evaluates the significance of each association rule, as described in more detail below, to rank each association rule based on its significance. The system may then use these rankings to eliminate insignificant rules from the output shown to the user. In the alternative, the system may simply rank the association rules shown to the user based on their significance so that the user may review the most significant association rules first. As described below in more detail, the most significant association rules may also be used as predictive association rules.

FIG. 4 is a flowchart which illustrates more details of a process 110 for discovering significant association rules in accordance with the invention. In step 112, one or more smaller databases are generated which are subsets of the original database as described below using a random seed in order to resample the overall database. Next, in step 114, association rules are generated in each synthetic database in which each generated association rule has the same threshold. Next, in step 116, a significance indicator of each association rule is determined, such as a p-value as described below. The significance indicator indicates the significance of the particular association rule relative to the database. In one embodiment, the significance may be the statistical significance of the association rule. Next, in step 120, the significance indicators for each synthetic database is ranked and the lowest significance indicator may be determined in step 122. Thus, in accordance with the invention, the significance of an association rules is determined to reduce the number of insignificant association rules which the user must review.

To better understand the invention, a simple example of the desirability of determining the significance of an association rule in accordance with the invention will be described. For purposes of this example, each transaction is a toss of a coin which may be either heads or tails. During many coin tosses, there is a series of fifteen sequential coin tosses where the results are all heads which is believed to be very interesting and surprising. However, there were actually one million people tossing a million coins thousands of times so that the statistical significance of the series of fifteen heads is actually minimal. A conventional association rule system, which does not take statistical significance into account, would discover this pattern and report this pattern as interesting to the user of the system. This association rule (i.e., the series of fifteen heads), however, is a false discovery because it is not statistically significant due to the total number of coins tosses which occurred. The process in accordance with the invention, however, would detect the statistical insignificance of the pattern and either remove it from the list of discovered association rules or give it a low statistical value ranking so that it would appear at the bottom of a list of discovered association rules with are ranked by their statistical significance. Thus, the invention helps estimate and reduce the number of false discoveries in the set of association rules and reduce the total number of association rules which must be reviewed by the user of the system. The system may also use the calculated statistical significance of each association rule in order to rank the association rules based on their statistical significance so that the user may view the most statistically significant association rules first. The system and method in accordance with the invention may also generate predictive association rules, as described below. Now, prior to describing the process for discovering the predictive and statistically significant rules in accordance with the invention, the technique for determining the statistical significance of a single association rule and the technique for determining the statistical significance of a set of association rules will be described.

The statistical significance of a single association rule may be determined by viewing a dataset consisting of n transactions as the realizations of n independent identically distributed random Boolean vectors which are sampled from a real world distribution. If $\pi^S$ denotes the real world probability that a transaction contains a given itemset S, then the number of transactions $N^S$ in the sample (i.e., the dataset) that contains S is a binomial random variable with success probability $\pi = \pi_S$ and n trials.

Next, the minimum support requirement may be cast in a hypothesis testing network. For example, suppose our minimum support requirement is 10%. For each itemset S, let $H_O^S$ be the null hypothesis that $\pi^S = 0.1$ and let it be tested against the alternative hypothesis $H_1^S$ that $\pi^S > 0.1$. Next, $p^S$ is equal to the fraction of transactions in the dataset which contain S. The test for the statistical significance of a single association rule is therefore to compare $p^S$ with a threshold value $p_0$ and reject $H_O^S$ if and only if $p^s > p_0$. This test may introduce two possible errors:

| | TRUTH | |
| --- | --- | --- |
| DECISION | $H^S_O$ true | $H^S_1$ true |
| Do Not Reject $H_O^S$ | Correct decision | Type II Error |
| Reject $H_O^S$ | Type I Error | Correct Decision |

The threshold variable, $p_0$, is determined by a bound on the desired probability of a Type I error, which is called the significance level. The selection of $p_0$ will be described in more detail below.

The p-value of a test result is the probability of obtaining an outcome as least as extreme as the outcome actually observed assuming that the null hypothesis is true. In our example, the p-value corresponding to an observed fraction $p^S$ is equal to the probability, under the assumption that $\pi^S = 0.1$, that the fraction of transactions which contain S is greater than or equal to $p^s$. In order to compute the p-value, a normal approximation, a Poisson approximation or an exact binomial distribution may be used depending on the actual values of n, the minimum support requirement and the observed support. For example, suppose n=10,000, the minimum support is $\pi = 0.1$ and the observed support is p=0.1009 and we use the normal approximation. The mean is $\pi = 0.1$ and the standard deviation is $$\sqrt{\frac{\pi(1-\pi)}{n}} = (0.09/10,000)^{1/2} = 0.003.$$

Since p is three standard deviations greater than $\pi$, the p-value is 0.0013.

Next, it is necessary to determine the independence of the association rules. Consider an association rule, $S \Rightarrow T$ where S and T are sets of items. As a null hypothesis, we assume that S and T occur in transactions independently so that $\pi^S \wedge T > \pi^S \times \pi^T$. As an alternative hypothesis, we can use the inequality $\pi^S \wedge T > \pi^S \times \pi^T$ which means that the conditional probability of T given S is greater than the probability of T. If the values $\pi^S$ and $\pi_T$ are assumed to be known with sufficient accuracy, the value of $(\pi^S \times \pi^T)$ may be used to compute the p-value for $S \Rightarrow T$. This p-value corresponds to the probability, under the assumption that S and T are independent, that the empirical frequency of the set $S \cup T$ will be greater than $p^S \wedge T$. Since we do not know the actual values of $\pi_S$ is and $\pi^T$, we use $p^S$ and $p^T$ (the fractions of transactions that contain S and T, respectively) as estimates for $\pi^S$ and $\pi^T$. A lower p-value indicates that it is more likely that S and T are not independent. Now, the statistical significance of a set of associations will be described.

To determine the statistical significance of a set of associations, assume that k null hypotheses $H_0^1, \ldots, H_0^k$ and use the variable, $q^i$, to denote the probability of rejecting $H_0^i$ when it is true. The probability of rejecting at least one of the null hypotheses when they are all true is at most $q^1 + \ldots + q^k$. Thus, if it is desirable for the latter to be smaller than 0.05, for example, one may determine thresholds for the individual tests so the $q_i < 0.05/k$. This bound may be very small if the number of hypothesis being tested simultaneously is very large. Therefore, since under the null hypothesis the empirical p-value is distributed uniformly, when k true null hypotheses are tested, the expected value of the smallest p-value is $1/(k+1)$. Therefore, in order to achieve a small probability of rejecting any true null hypothesis, thresholds must be chosen to IC) be smaller than that value. For example, when testing independence of pairs in a set of, for example, 10,000 items, the value of k would be greater than $10^7$.

In order to achieve a good probability of rejecting most "false discoveries", the probability of rejecting some true discoveries must also increase (i.e., any attempt to discover more true rules also increases the risk of false discoveries). It is desirable, however, to compute the number of false discoveries for any given threshold. As described below, an upper bound on the number of hypotheses that are implicitly tested is determined and this value may be used to estimate the number of false discoveries for any given threshold.

The number of hypotheses that are being implicitly tested in any association rule discovery process is typically much larger than just the number of frequent itemsets or the number of rules that are generated. Assuming we have a set of frequent pairs, let the null hypothesis $H_0^{ij}$ be that the items i and j are independent. To find the set of frequent pairs, the association discovery process count the cross-product of all of the frequent items. If there are 1000 frequent items, then there are approximately 5000 pairs of items whose support is counted. If the association discovery process throws away 4000 of these at random and tests $H_0^{ij}$ only for the remaining 1000 pairs, then only 1000 hypotheses have been tested. On the other hand, if the association discovery process picks the 1000 pairs with the smallest p-values, then 5000 hypotheses have been tested. Therefore, if the association discovery process first considers the 1000 pairs with the highest support and only then looks at the p-values, then the actual number of hypotheses being tested can not be determined. Thus, the upper bound on the number of hypotheses is this example is 5000.

The upper bound on the number of hypotheses can be extended to include itemsets and rules with more than two items. For itemsets with three items, the number of hypotheses is less than the product of the number of frequent pairs times the number of frequent items. By summing this over all of the passes, we get Number of Hypotheses≦(Number of Frequent Itemsets×Number of Frequent Items). Now, the overall method of data mining will be described.

FIG. 3 illustrates a method 100 for data mining which may include the statistical significance determining process in accordance with the invention. The method 100 starts at step 102 in which a database is processed (i.e., mined) to discover any association rules as described above. As described above, the invention may be used with a variety of conventional data mining systems. Several examples of data mining systems are described is U.S. Pat. No. 5,615,341 to Agrawal et al., U.S. Pat. No. 5,664,171 to Agrawal et al., U.S. Pat. No. 5,664,174 to Agrawal et al. and U.S. Pat. No. 5,724,573 to Agrawal et al., which are assigned to the assignee of the present application and are incorporated herein by reference. Once the association rules have been discovered, in step 104, the statistical significance of each discovered association rule is determined in accordance with the invention. As described above, the statistical significance of the association rule may be used in a variety of manners. For example, it may be used to rank the discovered association rules based on the statistical significance so that the user may review the most statistically significant rules first. In another example, the statistical significance measure indicates the likelihood of false discoveries in the discovered association rules. Now, a method for determining the statistical significance of an association rule will be described.

A method 110 for determining the statistical significance of an association rule in accordance with the invention begins at step 112 in which one or more synthetic databases are generated from the original database using random seeds. This process is also referred to as determining thresholds by resampling. To determine a threshold by resampling, we know the observed singleton frequencies pi of the items and we generate one or more synthetic data sets of transactions under a model where the occurrences of all of the items are independent (i.e., the transactions are generated independently). For each transaction j and for item i, a number $x_{ij}$ is determined from a uniform distribution over [0,1] and includes i in j if and only if $x_{ij} < p_i$. In a preferred embodiment, nine datasets are generated wherein each dataset has 10,000 transactions. The number of datasets generated depends on the number of frequent items rather than the number of transactions. The number of frequent items depends on the specified minimum support. Once the synthetic data sets are generated, the association rule algorithm may be run on these datasets. For $i=1, \ldots, K$, let $v_{ij}$ denote the ith smallest p-value in the dataset j. Let $V_i$ denote the mean of the values $v_{i1}, v_{i2}, \ldots$ which estimates the expectation of the ith smallest p-value when all the null hypotheses are true. Based on the above, it is estimated at most i false discoveries when we place the threshold at $V_i$. These estimates are useful in order to assess the quality of the set of association rules which have been mined from a real dataset. For example, if in a real dataset, we report all of the association rules with p-values smaller than some threshold, t, and if $V_i < t \leq V_{i+1}$, then we estimate that no more than i of these rules will be false discoveries since, even for a purely synthetic dataset where all the null hypotheses are true, no more than i turn out to have such small p-values. As the threshold, t, increases, more association rules may be discovered, but a larger number of the discovered rules are expected to be false.

Next, in step 114, association rules are discovered in the synthetic databases using the same threshold value, t. Next, in step 116, the p-value, as described above, is computed for each association rule in each of the synthetic dataset. Once the p-values have been determined, as described above, the determined p-values are ranked for all of the synthetic datasets in step 120 and the lowest p-value is determined. The lowest p-value indicates the least number of false discoveries. Now, experimental results using the method in accordance with the invention will be described.

To test these results, the method was performed on three real datasets whose characteristics are set forth below on Table 1. Although particular minimum support and confidence values are shown in the Table, similar results were achieved for other values of support or confidence.

| Dataset | SuperMarket | Dept. Store | Mail Order |
|---|---|---|---|
| Number of Customers | 6200 | Unknown | 214,000 |
| Number of Transactions | 1.5 million | 570,000 | 3 million |
| Items per Transaction | 9.6 | 4.4 | 2.6 |
| Minimum Support | 2% | 1% | 0.02% |
| Minimum Confidence | 25% | 25% | 25% |
| Number of Frequent Items | 201 | 283 | 2849 |
| Number of Frequent Itemsets | 2541 | 943 | 10,173 |
| Number of Association Rules | 4828 | 1020 | 2479 |

The results of the simulation are set forth in Table 2 below.

| Simulated Database | Number of Transactions | Expected Lowest p-value | Lowest p-value | Next Lowest p-value |
|---|---|---|---|---|
| SuperMarket | 1,000 | $2 \times 10^{-6}$ | .0026, .0048, .0072 | .0038, .0074, .0089 |
| SuperMarket | 10,000 | $2 \times 10^{-6}$ | .0030, .0044, .0064 | .0049, .0110, .0140 |
| SuperMarket | 100,000 | $2 \times 10^{-6}$ | .0011, .0022, .0086 | .0049, .0055, .0096 |
| Dept. Store | 1,000 | $4 \times 10^{-6}$ | $3 \times 10^{-5}$, .0025, .0025 | .0010, .0027, .0029 |
| Dept. Store | 10,000 | $4 \times 10^{-6}$ | .0013, .0025, .0032 | .0032, .0040, .0090 |
| Dept. Store | 100,000 | $4 \times 10^{-6}$ | .0002, .0021, .0045 | .0006, .0022, .0090 |
| Mail Order | 100,000 | $3 \times 10^{-6}$ | $2 \times 10^{-5}$, $6 \times 10^{-5}$, .0002 | $7 \times 10^{-5}$, $8 \times 10^{-5}$, .0003 |

The results listed are using three different random seeds to see the variations in the p-values. For the SuperMarket and department store data, we obtained results for three different sized datasets. For the mail order data, the minimum support was too low to get any meaningful results with the smaller dataset sizes. For each dataset and size, the smallest p-value is estimated based on the upper bound on the number of hypotheses as was described above. As shown by the results in Table 2, there was approximately a factor of 10,000 difference between the expected lowest p-value and the actual smallest p-value for the SuperMarket data and a factor of 5000 for the other two datasets.

For the SuperMarket data, only two association rules (out of 4828) had p-values higher than $10^{-9}$ and the p-values were 0.0037 and 0.0051. For the Department Store data, only nine rules (out of 1020 rules) had p-values higher than $10^{-100}$ and all their p-values were greater than 0.09. For the Mail Order data, none of the rules (out of 2479) had p-values greater than $10^{-40}$ indicating that the number of false discoveries was extremely small. The low number of false discoveries as shown by the data in Table 2 indicates that the support and confidence thresholds do an excellent job of pruning out most rules which are not statistically significant. For example, consider an association rule where the support for the consequent is 5%. For this rule to meet the minimum confidence constraint, the support (confidence) of this rule must be at least five times the expected support (confidence) assuming that the support and confidence are independent. Therefore, unless the minimum support level is very low, this rule would have a low p-value indicating that it is not a false discovery. Now, a method for determining confidence intervals for the purposes of predictive association rules will now be described.

To determine the confidence interval, let $B(x;n,s)$ represent the probability that a binomial random variable with a success probability, s, for n trials, will have a value greater than a threshold, k. The p-value of an association rule with an observed frequency, p, with respect to a desired support level, s, is equal to $B(np;n,s)$. If the actual frequency is denoted by Tr, then the probability of the event $\pi-x \leq p \leq \pi+y$ is the same as the confidence level of an interval of the form $[p-y, p+x]$. Therefore, the symmetry of the normal approximation allows calculation of confidence intervals based on the observed value p. If a confidence interval at the 95% level is constructed for each association rule, then, for each association rule, there is an aproiri probability of 95% that the true frequency lies within the interval. Thus, the expected proportion of the association rules where the true frequency lies within the respective interval is 95%. The confidence interval may therefore be determined by assuming that events $E_1 \subset E_2$. If [a,b] and [c,d] are confidence intervals of level 1-$\epsilon$ for $\pi(E_1)$ and $\pi(E_2)$, respectively, and if c>0, then [a/d, b/c] is a confidence interval for $p(E_1|E_2)$ with a confidence level of at least 1-2$\epsilon$. The confidence interval may permit a user to use association rules predictively by giving them an idea of how much variance they can expect in the support and confidence of an association rule in the future.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. A computer program device, comprising:

a computer program storage device readable by a digital processing apparatus; and a program means on the program storage device and including instructions executable by the digital processing apparatus for controlling the apparatus to perform a method of determining one or more association rules having a predetermined relationship to a dataset, the dataset comprising one or more transactions, each transaction containing one or more items, the method comprising:

generating one or more synthetic databases from the dataset, each synthetic database containing a plurality of transactions, the occurrences of all items in each synthetic database being independent;

identifying a plurality of association rules having a similar likelihood of occurrence for each synthetic database;

determining the likelihood of an unexpected result for each discovered association rule in each synthetic database to determine the significance of each discovered association rule; and ranking the identified association rules based on the determined likelihood in order to identify association rules which have a predetermined relationship relative to the dataset.

2. The computer program device of claim 1 further comprising the steps of generating a predictive association rule which indicates how much variance in a support value and a confidence value of the association rule is expected.

3. The computer program device of claim 2, wherein said predictive association rule generation comprises generating a confidence interval for each association rule.

4. The computer program device of claim 3, wherein generating the confidence interval comprises generating a confidence interval having a confidence level of at least 1-2$\epsilon$.

5. The computer program device of claim 1 further comprising viewing the discovered association rules in an order based on the determined probability.

6. A computer program product for use with a computer system, a central processing unit and means coupled to the central processing unit for storing a database to determine a predetermined relationship between one or more association rules mined from a database, comprising:
- a data storage device including a computer usable medium having computer readable program means for determining a predetermined relationship of previously discovered association rules, the computer usable code means having:
- computer readable code means for generating one or more synthetic databases from the dataset, each synthetic database containing a plurality of transactions wherein the occurrences of all items in the databases are independent;
- computer readable code means for discovering a plurality of association rules having a similar likelihood of occurrence for each synthetic database;
- computer readable code means for determining a likelihood of an unexpected result for each discovered association rule in each synthetic database to determine the relationship of the each discovered association rule to the dataset; and
- computer readable code means for ranking the discovered association rules based on the determined likelihood in order to identify association rules which have a predetermined relationship to the dataset.

7. The computer program product of claim 6 further comprising computer readable code means for generating a predictive association rule which indicates how much variance in a support value and a confidence value of the association rule is expected.

8. The computer program product of claim 7, wherein said predictive association rule generation comprises computer readable code means for generating a confidence interval for each association rule.

9. The computer program product of claim 8, wherein generating the confidence interval comprises computer readable code means for generating a confidence interval having a confidence level of at least $1-2\epsilon$.

10. The computer program product of claim 6 further comprising computer readable code means for viewing the discovered association rules in an order based on the determined probability.

11. A database mining system for determining the predetermined relationship between one or more association rules mined from a database, comprising:
- means for generating one or more synthetic databases from the dataset, each synthetic database containing a plurality of transactions, each transaction containing one or more items, wherein the occurrences of all items in the synthetic database are independent;
- means for identifying a plurality of association rules having a similar likelihood of occurrence for each synthetic database;
- means for determining a likelihood of an unexpected result for each identified association rule in each synthetic database to determine the relationship between the association rule and the dataset; and
- means for ranking the identified association rules based on the determined likelihood in order to identify association rules which have a predetermined relationship to the dataset.

12. The system of claim 11 further comprising means for generating a predictive association rule which indicates how much variance in a support value and a confidence value of the association rule is expected.

13. The system of claim 12, wherein said predictive association rule generation means further comprises means for generating a confidence interval for each association rule.

14. The system of claim 13, wherein the means for generating the confidence interval comprises means for generating a confidence interval having a confidence level of at least $1-2\epsilon$.

15. The system of claim 11 further comprising means for viewing the discovered association rules in an order based on the determined probability.

16. A computer-based system for discovering purchasing tendencies of consumers by identifying association rules between itemsets of transactions within a dataset, each transaction containing one or more items, the system comprising:
- means for identifying association rules in the dataset;
- means for generating one or more synthetic databases from the dataset, each synthetic database containing a plurality of transactions wherein the occurrences of all items in the synthetic database are independent;
- means for identifying a plurality of association rules having a similar likelihood of occurrence for each synthetic database;
- means for determining the likelihood of an unexpected result for each identified association rule in each synthetic database to determine a significance of each identified association rule; and
- means for ranking the identified association rules based on the determined likelihood in order to identify association rules which have a predetermined relationship to the dataset.

17. The system of claim 16 further comprising means for generating a predictive association rule which indicates how much variance in a support value and a confidence value of the association rule is expected.

18. The system of claim 17, wherein said predictive association rule generation means further comprises means for generating a confidence interval for each association rule.

19. The system of claim 18, wherein the means for generating the confidence interval comprises means for generating a confidence interval having a confidence level of at least $1-2\epsilon$.

20. The system of claim 16 further comprising means for viewing the discovered association rules in an order based on the determined probability.

21. A computer implemented process for determining a predetermined relationship between one or more association rules and a dataset from which the association rules are mined, the dataset comprising one or more transactions, each transaction containing one more items, the method comprising:
- generating one or more synthetic databases from the dataset, each synthetic database containing a plurality of transactions wherein the occurrences of all items are independent;
- identifying a plurality of association rules having a similar likelihood of occurrence for each synthetic database;
- determining a likelihood of an unexpected result for each identifier association rule in each synthetic database to determine if a predetermined relationship exists between each association rule and the dataset; and ranking the identified association rules based on the determined likelihood in order to identify association rules which have a predetermined relationship to the dataset.

22. The method of claim 21 further comprising generating a predictive association rule which indicates how much variance in a support value and a confidence value of the association rule is expected.

23. The method of claim 22, wherein said predictive association rule generation further comprises generating a confidence interval for each association rule.

24. The method of claim 23, wherein generating the confidence interval comprises generating a confidence interval having a confidence level of at least $1-2\epsilon$.

25. The system of claim 21 further comprising viewing the discovered association rules in an order based on the determined probability.

* * * * *